(12) United States Patent
Humburg

(10) Patent No.: US 6,431,459 B1
(45) Date of Patent: Aug. 13, 2002

(54) LIQUID FUEL-OPERATED WATER HEATER OR AIR HEATER OF A MOTOR VEHICLE

(75) Inventor: Michael Humburg, Göppingen (DE)

(73) Assignee: J. Eberspächer GmbH & Co. KG (DE)

( * ) Notice: Subject to any disclaimer, the term of this patent is extended or adjusted under 35 U.S.C. 154(b) by 0 days.

(21) Appl. No.: 09/982,037

(22) Filed: Oct. 18, 2001

(30) Foreign Application Priority Data

Oct. 19, 2000 (DE) .......................... 100 51 867

(51) Int. Cl.⁷ .............................. G05D 23/00
(52) U.S. Cl. .................. 237/2 A; 237/12.3 C; 374/165; 62/239
(58) Field of Search ............. 237/2 A, 12.3 C, 237/12.3 R, 12.3 B; 165/11.1; 236/78 B, 21 B; 62/239; 374/165, 144, 142

(56) References Cited

U.S. PATENT DOCUMENTS

| | | | | |
|---|---|---|---|---|
| 4,773,588 A | * | 9/1988 | Okada .................... | 237/12.3 C |
| 4,944,454 A | * | 7/1990 | Widemann et al. .... | 237/12.3 C |
| 5,788,148 A | * | 8/1998 | Burner et al. ............. | 236/21 B |
| 6,006,997 A | * | 12/1999 | Pfister et al. ............. | 236/78 D |
| 6,021,752 A | * | 2/2000 | Wahle et al. .......... | 123/142.5 R |
| 6,078,107 A | * | 6/2000 | Kahnau et al. ............... | 165/42 |

* cited by examiner

Primary Examiner—Harold Joyce
Assistant Examiner—Derek S. Boles
(74) Attorney, Agent, or Firm—McGlew and Tuttle, P.C.

(57) ABSTRACT

A heater, especially a liquid fuel-operated water heater (10) or air heater of a motor vehicle in the form of an auxiliary heater or a parking heater has a housing jacket (1) and a heat exchanger (2) as well as with a control device (11) for regulating or monitoring the heating operation via at least one temperature sensor (3), especially a regulating temperature sensor and/or overheating sensor. The temperature sensor (3) is arranged on the underside of a control device bottom plate (4) facing the temperature sensor (3) on the housing jacket (1), wherein the temperature sensor (3) extends through an opening of the housing jacket (1), especially a water jacket, in the direction of the heat exchanger (2) and is preferably pretensioned by a spring. As a result, the temperature sensor can be mounted on the control device bottom plate already during the manufacture of the control device and finally mounted together with the control device bottom plate rapidly and reliably.

20 Claims, 1 Drawing Sheet

LIQUID FUEL-OPERATED WATER HEATER OR AIR HEATER OF A MOTOR VEHICLE

FIELD OF THE INVENTION

The present invention pertains to a heater, especially a water or air heater operated with liquid fuel for a motor vehicle in the form of an auxiliary heater or a parking heater, with a housing jacket and a heat exchanger as well as with a control device for regulating and monitoring the heating operation by means of at least one temperature sensor, especially a regulating temperature sensor and/or an overheating sensor.

BACKGROUND OF THE INVENTION

A temperature sensor in the form of a regulating temperature sensor, which is preferably arranged in the air or water channel in the area of the heat exchanger and is an actual value transducer of a control circuit, is used for the space temperature control in vehicle heaters of the above-mentioned type. The control device regulates the heating output in such a way that the space temperature corresponds to the preset set point with the smallest possible deviation. Another temperature sensor in the form of an overheating sensor, which is located at a suitable hot point in the heater, especially in the dome area of a heat exchanger, is used for the upward limitation of the temperature of the heater by switching off the heater in order to rule out a state of overheating in the heater.

It is disadvantageous that the regulating temperature sensor and the overheating sensor are prefabricated as separate components with rather long cables, contacts and individual lead insulation and are arranged, sent for mounting and mounted individually and stocked as separate components. The two sensors are identical components and can be easily transposed at the plug of the control device.

SUMMARY AND OBJECTS OF THE INVENTION

Based on the above-mentioned state of the art, the object of the present invention is to improve a heater of the type mentioned in the introduction such that it can be mounted simply, rapidly and reliably and is nevertheless reliable in operation.

According to the invention, a heater, especially a liquid fuel-operated water heater or air heater of a motor vehicle in the form of an auxiliary heater or a parking heater is provided. The heater has a housing jacket and a heat exchanger as well as a control device for regulating or monitoring the heating operation. At least one temperature sensor is provided, especially a regulating temperature sensor and/or overheating sensor. The temperature sensor is arranged on the underside of a control device bottom plate facing the housing jacket and extends through an opening of the housing jacket, especially a water jacket, in the direction of the heat exchanger.

As a result, the overheating temperature sensor and/or temperature sensor can be mounted on the underside of the control device bottom plate already at the time of the manufacture of the control device and the final mounting of the prefabricated control device bottom plate with the connected temperature sensor on the heater can be performed easily and rapidly with the positioned ID temperature sensor. The opening in the housing jacket is used as the positioning aid.

The temperature sensor, which is fixed on the underside of the control device bottom plate and is connected to the control device bottom plate, is preferably accommodated displaceably in the opening of the housing jacket which is designed as a fitting opening. As a result, fine positioning of the temperature sensor is possible. In addition, the depth of extension of the temperature sensor in the direction of the heat exchanger can be set exactly.

The temperature sensor preferably has a fitting housing part with a circumferential recess, the outer circumference of the fitting housing part being accommodated in a sliding fit in the fitting opening. As a result, the pushing in of the temperature sensor into the fitting opening is facilitated and jamming or tilting is minimized.

A sealing ring, which ensures good sealing of the medium—air or water—which is guided in the heater, is preferably located in the housing recess.

Provisions are made in an especially expedient embodiment variant for the temperature sensor and the control device bottom plate to be supported on a protective housing of the control device via a compression spring located in the control device. In the installed state of the temperature sensor or sensors, it is thus guaranteed that, e.g., expansions (movements) of the heat exchanger caused by temperature variations can be absorbed without damage to the sensor, the control device or the heat exchanger.

The housing jacket preferably has, in the axial extension of the fitting opening, a radially outwardly directed projection, which is located away from the fitting opening and on which the control device bottom plate is flatly supported. A close contact is obtained for the control housing bottom plate as a result. In addition, the control device bottom plate can be arranged at a spaced location from the housing jacket, preferably parallel to the axis. The distance creates a heat-insulating air gap between the housing jacket and the control device bottom plate.

The control device bottom plate is advantageously also pressed to the projection by the force of the compression spring. The mounting of the control device bottom plate is further simplified as a result in case of sufficient seating of the control device bottom plate in the control device.

The control device bottom plate is preferably supported at the projection loosely, especially in an axially displaceable manner. As a result, the control device bottom plate, which is fixed in the installed position by the opening of the housing jacket and the temperature sensor passed through there, can be mounted at the projection in a stress-free manner in the anal direction. A possible thermal expansion is thus compensated with certainty.

A pressing plate, which absorbs the compressive force of the compression spring and distributes it two-dimensionally in the control device bottom plate, maybe fastened on the top side of the control device bottom plate in the area of the compression spring as a protection for the control device bottom plate.

The top side of the pressing plate preferably contains an axial guide for the compression spring, especially a fitting recess, which positions the compression spring in the installed state.

In particular, the top side of the control device bottom plate is arranged at a spaced location from the protective housing in order to create an installation space for electronic components, which are preferably fastened and connected on the top side of the control device bottom plate.

The temperature sensor preferably has at least one connection cable, which is plugged, soldered or connected in another way to the underside of the control device bottom plate in such a way as to establish a connection. The connection cable can have a short length as a result. Individual seals are eliminated.

The temperature sensor may be spring-pretensioned at a radially inner stop of the heater by the force of the compression spring. The radially inner stop may be a shoulder or a taper in the opening of the housing jacket.

However, the radially inner stop is especially preferably a jacket surface of the heat exchanger itself, which is especially a contact surface of the temperature sensor, whose temperature is to be monitored. A reliable, clearance-free and stress-free contact is thus established between the temperature sensor and the heat exchanger with simple means, without the risk of damage to the sensor during operation due to possible temperature variations or thermal expansions.

The temperature sensor may be an individual sensor, especially an overheating temperature sensor or a regulating temperature sensor, and a plurality of temperature sensors, which are located at mutually spaced locations from one another and extend through corresponding openings in the housing jacket, may also be arranged on a single control device bottom plate.

The temperature sensor is preferably a combination sensor, which contains the overheating sensor and the regulating temperature sensor as one assembly unit, which offers advantages in from manufacture and mounting. Thus, overheating sensors and regulating temperature sensors cannot be transposed with one another during the mounting, either.

The protective housing itself is firmly and water-tightly connected, especially screwed to the housing jacket.

The present invention advantageously leads ultimately to a reduction in the costs of parts and mounting.

The present invention will be explained in greater detail below on the basis of an exemplary embodiment with reference to the attached drawing that schematically shows an axial vertical section of the right upper area of a heater.

The various features of novelty which characterize the invention are pointed out with particularity in the claims annexed to and forming apart of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
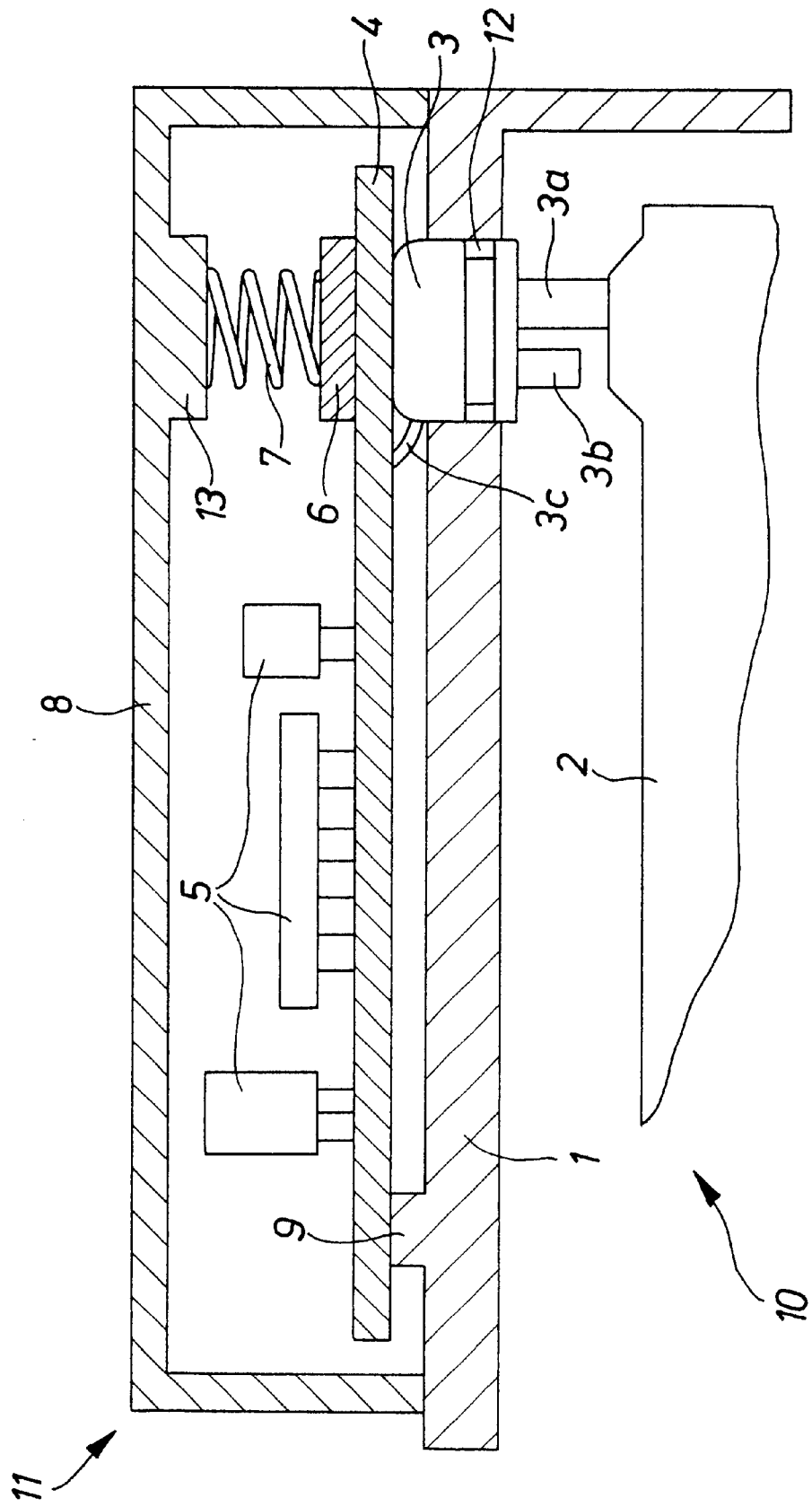
FIG. 1 is a schematic axial vertical sectional view of the right upper area of a heater according to the invention.

Referring to the drawings in particular, the heater is especially a liquid fuel-operated water heater 10 of a motor vehicle in the form of a parking heater and has, among other things, a housing jacket 1 in the form of a water jacket, a heat exchanger 2 as well as a control device 11 for regulating or monitoring the heating operation by means of a temperature sensor 3.

The temperature sensor 3 is designed as a so called combination sensor and comprises an overheating sensor 3a and a regulating temperature sensor 3b.

The temperature sensor 3 is arranged on the underside of a control device bottom plate 4 facing the housing jacket 1 and extends through an opening of the housing jacket 1 in the direction of the heat exchanger 2.

The temperature sensor 3, which is fixed on the underside of the control device bottom plate 4 and is connected to the control device bottom plate 4, is displaceably accommodated in the opening of the housing jacket 1, which is designed as a fitting opening.

The temperature sensor 3 has a fitting housing part with a circumferential recess 12, the outer circumference of the fitting housing part being accommodated in a sliding fit in the fitting opening.

A sealing ring may be accommodated in the circumferential recess 12.

The temperature sensor 3 and the control device bottom plate 4 are supported on a protective housing 8 of the control device 11 via a compression spring 7 located in the control device 11.

The housing jacket 1 has, in the axial extension of the fitting opening, a radially outwardly directed projection 9, which is away from the fitting opening and on which the control device bottom plate 4 is two-dimensionally supported.

The control device bottom plate 4 is pressed by the force of the compression spring 7 to the projection 9 and is loosely supported at the projection 9 and is especially mounted axially displaceably at the projection 9.

A pressing plate 6, whose top side forms an axial guide for the compression spring 7 in the form of a fitting recess, is fastened on the top side of the control device bottom plate 4 in the area of the compression spring 7.

A corresponding additional fitting recess is provided in a projection 13 integrated in the protective housing 8 for the positive-locking mounting of the upper axial end of the compression spring 7.

The top side of the control device bottom plate 4 is located at a spaced location from the protective housing 8. Various electronic components 5, which are not specifically of interest here, are fastened and connected on the top side of the control device bottom plate 4.

The temperature sensor 3 has short connection cables 3c for the overheating sensor 3a and the regulating temperature sensor 3b, which are plugged into the underside of the control device bottom plate 4 in such a way as to establish a connection.

The temperature sensor 3 is spring-pretensioned at a radially inner stop of the heater by the force of the compression spring 7. The radially inner stop is especially a jacket surface of the heat exchanger 2. The jacket surface is a radially elevated contact surface of the overheating sensor 3a in the area of the bottom of the heat exchanger 2, whose temperature is to be monitored.

The protective housing 8 is firmly and water-tightly screwed to the housing jacket 1.

As can be seen, the above-mentioned water heater 10 can be mounted simply, rapidly and reliably.

The temperature sensors are mounted on the underside of the control device bottom plate 4 already at the time of the manufacture of the control device, and the sensors are fixed together on the underside as one assembly unit. The connection cables 3c of the sensors are then connected, especially plugged into the underside of the control device bottom plate 4.

The pressing plate 6 is fastened on the top side of the control device bottom plate 4 in the axial extension of the temperature sensor 3. Furthermore, the electronic components 5 are placed and connected. A sealing ring is also inserted into the circumferential recess 12 of the fitting housing part of the temperature sensor 3.

The control device bottom plate is subsequently placed on the housing jacket 1 such that the temperature sensor 3 extends through the associated opening of the housing jacket in the direction of the heat exchanger 2 to the extent that the overheating sensor 3a is in contact with the jacket of the heat exchanger 2. The lower axial end of the compression spring 7 is inserted into the fitting recess of the pressing plate 4 in a positive-locking manner and the box-like protective housing 8 adapted to the housing jacket 1 is then placed on the upper housing jacket 1 and is firmly and water-tightly screwed together with the housing jacket. After screwing together, the compression spring 7 is pretensioned such that, on the one hand, the overheating sensor 3a is reliably in contact with the heat exchanger 2, but can still yield radially to the outside when increased stresses occur, and, on the other hand, the axial end of the underside of the control device bottom plate which is away from the temperature sensor 3 is in close contact with the projection 9 in a non-positive manner and possibly permits an axial displacement there when increased thermal stresses are present.

While specific embodiments of the invention have been shown and described in detail to illustrate the application of the principles of the invention, it will be understood that the invention may be embodied otherwise without departing from such principles.

What is claimed is:

1. A liquid fuel-operated water heater or air heater of a motor vehicle, comprising:
    a housing water jacket;
    a heat exchanger disposed adjacent to said housing water jacket;
    a regulating temperature sensor and/or overheating temperature sensor; and
    a control device for regulating or monitoring the heating operation, said control device being connected to said regulating temperature sensor and/or overheating sensor, said control device including a control device bottom plate facing said housing water jacket, said temperature sensor being arranged on an underside of said control device bottom plate and extending in a direction of said heat exchanger.

2. A heater in accordance with claim 1, wherein said temperature sensor is fixed on an underside of said control device bottom plate and is connected to said control device bottom plate, said temperature sensor being displaceably accommodated in a fitting opening of said housing water jacket.

3. A heater in accordance with claim 2, wherein said temperature sensor has a fitting housing part with a circumferential recess, an outer circumference of said fitting housing part being accommodated in a sliding seat in the fitting opening.

4. A heater in accordance with claim 3, wherein a sealing ring is accommodated in said circumferential recess.

5. A heater in accordance with claim 1, wherein said temperature sensor and said control device bottom plate are supported on a protective housing of said control device via a compression spring located in the control device.

6. A heater in accordance with claim 2, wherein said housing jacket has, in an axial extension of said fitting opening, a radially outwardly directed projection, said projection being away from said fitting opening, said control device bottom plate being two-dimensionally supported on said projection.

7. A heater in accordance with claim 6, wherein the control device bottom plate is pressed by the force of a compression spring to said projection.

8. A heater in accordance with claim 6, wherein the control device bottom plate is loosely supported at said projection and is axially displaceable.

9. A heater in accordance with claim 5, wherein a pressing plate is fastened on a top side of said control device bottom plate in an area of said compression spring.

10. A heater in accordance with claim 9, wherein a top side of said pressing plate contains an axial guide for said compression spring including a fitting recess.

11. A heater in accordance with claim 5, wherein a top side of said control device bottom plate is arranged at a spaced location from said protective housing and said electronic components are fastened and connected on a top side of said control device bottom plate.

12. A heater in accordance with claim 1, wherein a temperature sensor has at least one connection cable, which is plugged into or soldered onto an underside of said control device bottom plate to establish a connection.

13. A heater in accordance with claim 5, wherein said temperature sensor is spring-pretensioned at a radially inner stop of the heater by the force of said compression spring.

14. A heater in accordance with claim 13, wherein said radially inner stop is a jacket surface of the heat exchanger.

15. A heater in accordance with claim 14, wherein said jacket surface is a contact surface of a temperature sensor, whose temperature is to be monitored.

16. A heater in accordance with claim 1, wherein said temperature sensor is an individual overheating temperature sensor or a regulating temperature sensor.

17. A heater in accordance with claim 1, wherein said temperature sensor is a combination sensor, which contains an overheating sensor and a regulating temperature sensor as one assembly unit.

18. A heater in accordance with claim 1, wherein a protective housing is firmly and water-tightly connected by screws to said housing jacket.

19. A liquid fuel-operated water heater or air heater of a motor vehicle, comprising:
    a housing jacket extending in an axial direction;
    a heat exchanger disposed adjacent to said housing jacket;
    a temperature sensor;
    a control device for regulating or monitoring the heating operation, said control device being connected to said temperature sensor, said control device including a control device bottom plate facing said housing jacket, said temperature sensor being arranged fixed on an underside of said control device bottom plate and extending in a direction of said heat exchanger, said temperature sensor being displaceably accommodated in a fitting opening of said housing jacket.

20. A heater in accordance with claim 19, wherein said temperature sensor and said control device bottom plate are supported on a protective housing of said control device via a compression spring located in the control device.

* * * * *